Sept. 20, 1971  J. H. WARREN ET AL  3,605,967
PROTECTIVE BEARING MEMBER FOR BRAKE OR CLUTCH
Filed April 7, 1969  3 Sheets-Sheet 1

INVENTORS
JOHN H. WARREN
MARVIN E. HOTCHKISS
BY John D. Haney
ATTY.

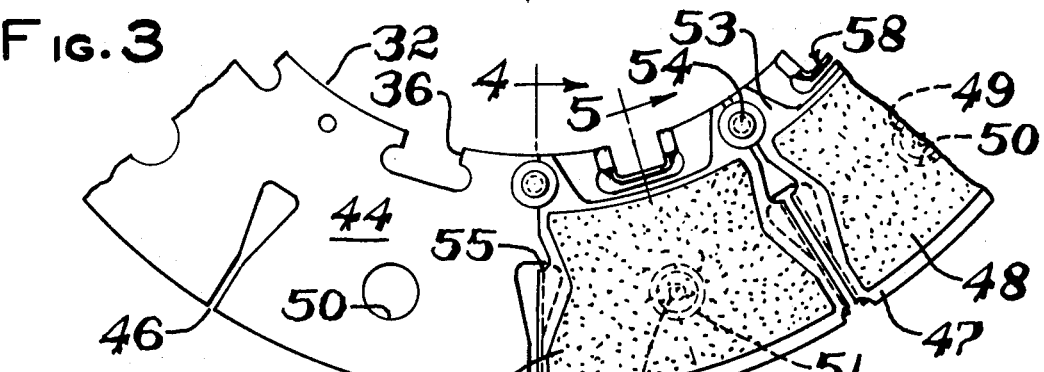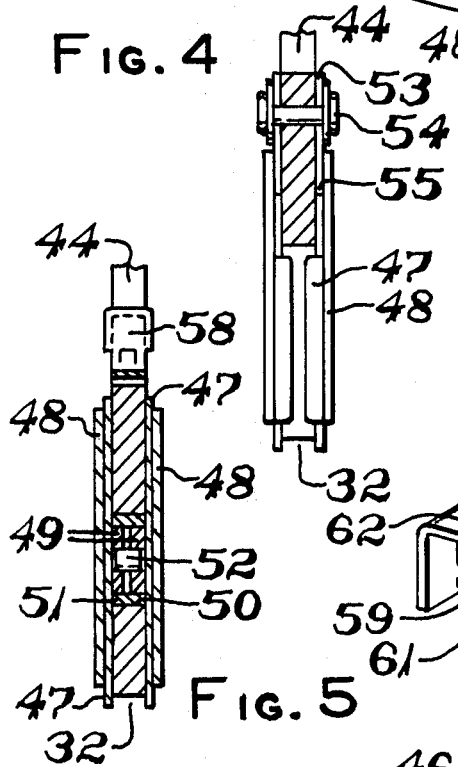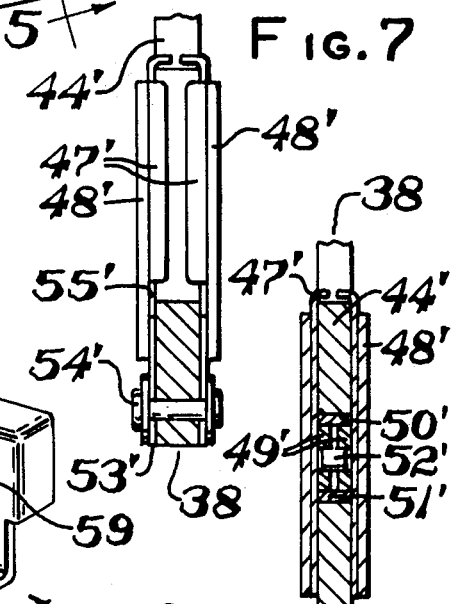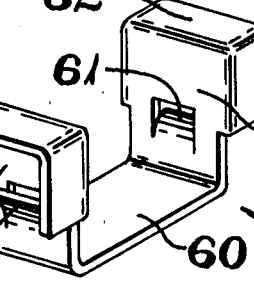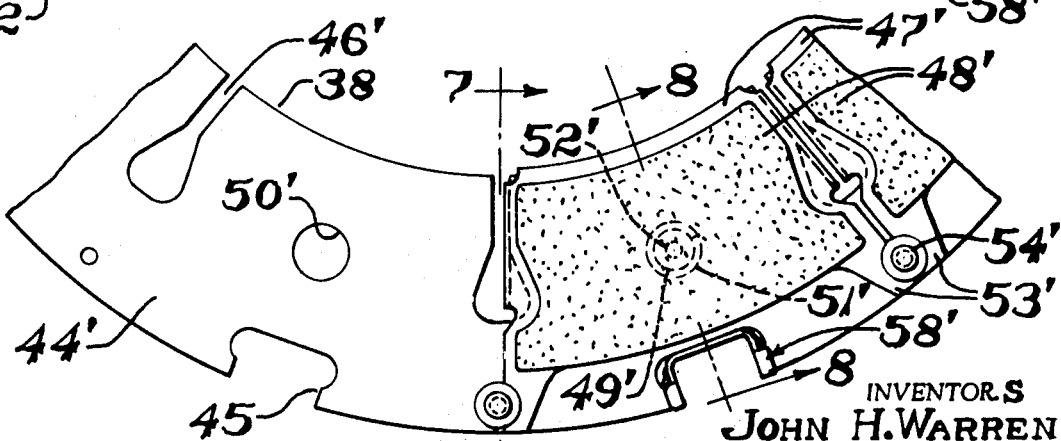

United States Patent Office 3,605,967
Patented Sept. 20, 1971

3,605,967
PROTECTIVE BEARING MEMBER FOR BRAKE OR CLUTCH
John H. Warren and Marvin E. Hotchkiss, Troy, Ohio, assignors to The B. F. Goodrich Company, New York, N.Y.
Filed Apr. 7, 1969, Ser. No. 813,977
Int. Cl. F16d *13/64*
U.S. Cl. 192—107R                                2 Claims

ABSTRACT OF THE DISCLOSURE

A protective bearing member for a brake which is suitable for very high energy service such as on aircraft and has rotors and stators of a lightweight frangible heat absorbing material. The protective bearing members are of a wear-resistant durable material and are mounted in slots in the peripheral edges of the stators and rotors for sliding engagement with keys or splines of the supporting members and for torque transmitting engagement with the stators and rotors.

BACKGROUND OF THE INVENTION

This invention relates to brakes and particularly to high energy brakes suitable, for example, for aircraft.

The brake requirements for new aircraft become more difficult to satisfy as each new aircraft is designed. This is because the weight and size limitations specified remain practically the same even though the requirements for heat energy which must be stored in the brake structure itself are greater than for the older aircraft which had the same brake weight and size limitations. This critical need for a brake which is capable of absorbing these extraordinary quantities of heat has created a need for a brake design which is adaptable to incorporate parts made of materials which have superior heat absorbing properties as well as a low specific gravity. For example, beryllium is uniquely suited for this purpose since it has unusually better heat absorbing properties than steel or similar materials for a part of the same size. These properties of beryllium are discussed in the French patent No. 1,225,-964 of Frank D. Snyder.

Meeting the increasingly severe requirements of modern aircraft design is not posible by empirically increasing the size of a brake which has been satisfactory for older aircraft. Instead it has been necessary to conceive a different brake design which will accommodate beryllium or other materials having superior heat absorbing properties and also provide a structurally sound brake capable of meeting the service and safety requirements of modern aircraft. The brake of this invention which is described hereinafter is of a uniquely practical design meeting these requirements by successfully qualifying for use on one of the largest aircraft ever built.

SUMMARY OF THE INVENTION

According to this invention a brake design is provided in which both the rotor and stator discs have lining pads mounted thereon for face-to-face engagement of the rotor friction lining with the stator friction lining surfaces. The annular rotor and stator discs of the brake are made of a material such as beryllium with excellent heat sink properties.

At the inner peripheral edges of the stator discs, slots are provided in which protective bearing members are mounted for engagement with splines on the axle. Not only do these members distribute the load over the bearing surfaces of the discs but they also prevent wear of the discs as they are moved axially along the splines. Similar slots are provided at the outer peripheral edges of the rotor discs for mounting protective bearing members which engage the keys on the wheel. These slots in both the stator and rotor discs have concave side walls to reduce stress concentration, provide a shoulder to retain the protective bearing members and provide maximum load distribution.

This brake construction lends itself to the re-use of the rotor and stator discs which need not be removed when the lining is worn. Furthermore, there is no wear on the discs at the friction surface because the linings are in frictional engagement with each other whereas in prior brake constructions the lining of one disc is in direct engagement with the other disc. The protective bearing members at the peripheral edges of the discs also protect the discs from wear and damage and are replaceable when worn.

The accompanying drawings show one preferred form of brake assembly made in accordance with and embodying this invention and which is representative of how this invention may be practiced.

BRIEF DESCRIPTION OF THE DRAWINGS

In the drawings:

FIG. 3 is a fragmentary view of the nonrotatable disc member assembly, parts being broken away.

FIGS. 4 and 5 are enlarged radial sections taken along lines 4—4 and 5—5 respectively of FIG. 3.

FIG. 6 is a fragmentary view of the rotatable disc member assembly, parts being broken away.

FIGS. 7 and 8 are enlarged radial sections taken along lines 7—7 and 8—8 respectively of FIG. 6.

FIG. 9 is an enlarged perspective view showing separately the protective wear-resisting clip member.

DETAILED DESCRIPTION

Figure 2:
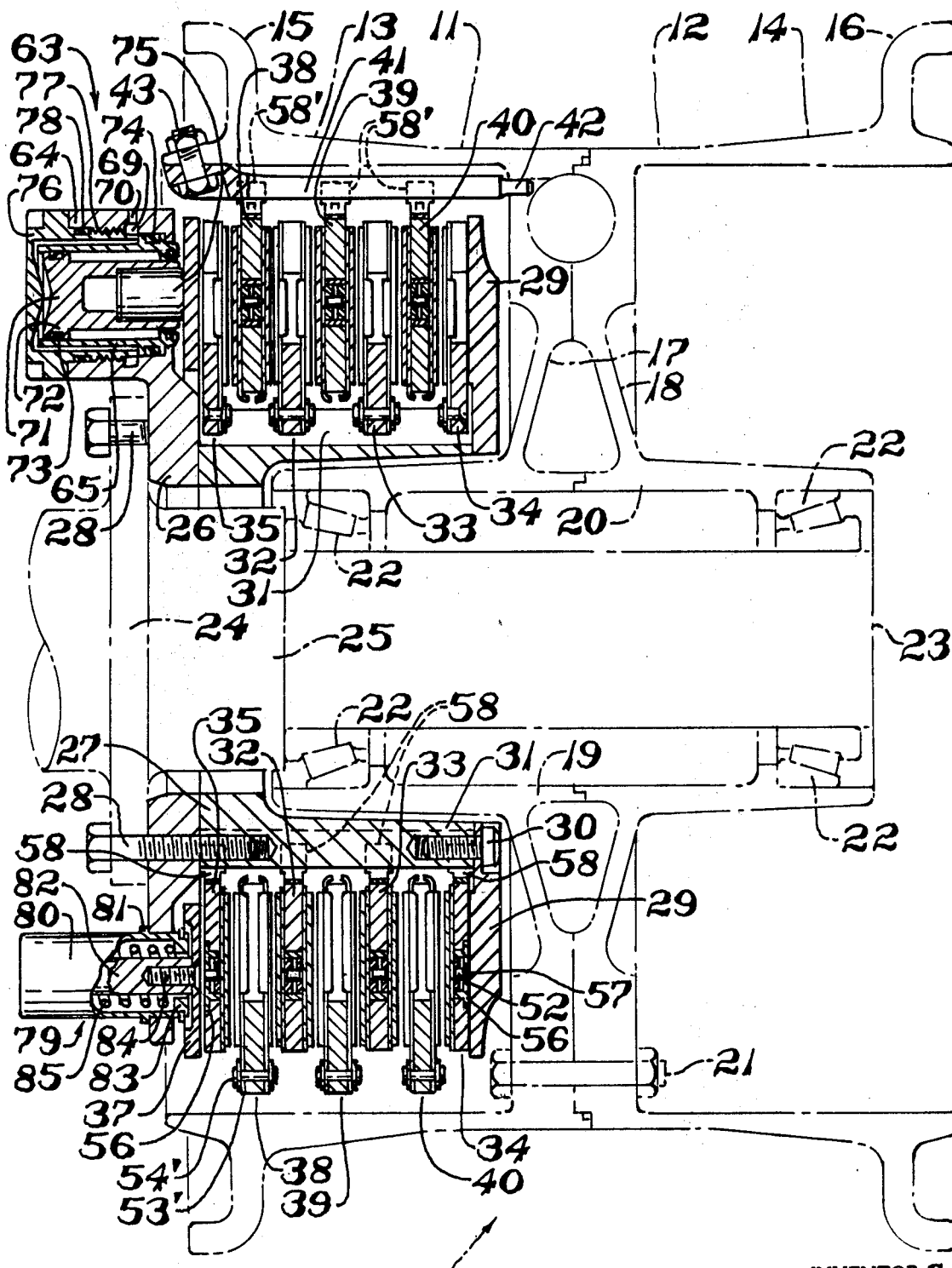
FIG. 2 is a diametrical cross sectioned view of the brake taken substantially on the line 2—2 of FIG. 1.

Referring to FIG. 2, the wheel and brake assembly there shown includes a generally cylindrical wheel 10 having matching wheel sections 11 and 12. Each of the wheel sections 11 and 12 has rim members 13 and 14, tire bead flanges 15 and 16, web members 17 and 18, and hub members 19 and 20 respectively. The wheel sections 11 and 12 may be fastened together by bolts 21 disposed in aligned holes of the web members 17 and 18.

The hub members 19 and 20 are supported for rotation on bearings 22 mounted on a nonrotatable axle member 23. Outboard of the wheel or away from the web member 17, a torque flange 24 is mounted on a boss 25 of the axle member 23. The torque flange 24 supports a torque frame 26 seated on the boss 25 and extending radially outward from the axle member 23. Inboard of the torque flange and also seated on the boss 25 of the axle 23 is a torque tube 27 extending inboard towards the web member 17 and within the space between the rim member 11 and hub member 19. The torque flange 24, torque frame 26 and torque tube 27 may be fastened together by bolts 28. At the inboard end of torque tube 27 an annular radially extending reaction plate member 29 is fastened to the torque tube as by bolts 30. On the radially outward surface of the torque tube 27 axially extending spline members 31 are disposed at circumferentially spaced-apart positions around the torque tube.

A brake of the general type described hereinafter is the subject of a related patent application having the same assignee as this application. In this particular form of brake there are two nonrotatable disc members 32 and 33 plus an inboard nonrotatable end plate 34 and an outboard nonrotatable end plate 35. The nonrotatable disc members 32 and 33 and end plates 34 and 35 have a configuration which may include openings such as slots 36 at their inner periphery for engaging spline members 31 on the torque tube 27. The inboard end plate is in abutting relationship with a reaction plate member 29 and the outboard end plate member 35 is in abutting relationship with a retractor plate 37 disposed between the end plate member 35 and torque frame 26.

Sandwiched between the end plates 34, 35 and nonrotatable disc members 32, 33 are rotatable disc members 38, 39 and 40. Each of these rotatable disc members has a configuration which may include openings such as slots 45 at the outer periphery to slidably engage key members 41 having lugs 42 at their inboard ends disposed in slots in the wheel web member 17 and having their outboard ends fastened by bolts 43 to the wheel rim member 13.

Referring to FIG. 3, nonrotatable disc member 32 is shown in more detail and is identical with nonrotatable disc member 33. An annular rigid disc 44 of a material having high heat absorbing capacity such as beryllium is used in this member as well as in the end plates 34, 35. Extending radially inwardly from the outer periphery of the rigid disc 44 are expansion slots 46. On each of the nonrotatable rigid discs 44 eleven of these expansion slots are disposed at circumferentially spaced-apart positions around the disc.

Between the expansion slots 46 friction lining members such as lining pads 47 are connected to the rigid disc 44. Friction lining material 48 is adhered to the lining pad 47 by suitable adhesives or other forms of fasteners not shown. This material may be a sintered metallic ceramic lining of the type described and set forth in the United States Patent No. 2,966,737 of R. E. Spokes et al.

As shown in FIG. 3, the lining pad 47 is sector shaped with a torque transmitting connection midway between the radially extending edges. As shown in FIG. 5, the connection is preferably a cylindrical plug 49 which may be resistance-welded to the lining pad 47 for disposition in a cylindrical hole 50 in the disc. A sleeve 51 of wear-resistant material such as steel may be disposed in the hole 50 surrounding the cylindrical plug 49. Lining pads 47 are mounted on both sides of the rigid disc 44 with cylindrical plugs 49 of opposite pads held by the disc in opposing relation in the same hole 50. A pin 52 which may have a serrated surface holds the two lining pads 47 together through a press-fit connection within the opposing cylindrical pulgs 49.

Each of the lining pads 47 has radially extending arms 53 inwardly of the friction generating heat path of the brake and in engagement with rivets 54 extending through the rigid disc 44 in the inner peripheral area of the disc.

The inboard nonrotatable end plates 34 and outboard nonrotatable end plate 35 have lining pads 47 identical to those of the nonrotatable disc members 32 and 33; however, the lining pads 47 are mounted on only one face of the rigid disc members 44. Accordingly, a flange collar member 56 shown in FIG. 2 is substituted for the sleeve 51 in the hole 50 which may be countersunk to receive the flange of this collar member. The pin 52 may then be fastened in press-fit relationship in the cylindrical plug 49 and in a hole 57 of the flange collar member 56.

Referring to FIGS. 6, 7 and 8, the rotatable disc member 38 which is identical with rotatable disc members 39 and 40 is shown in more detail. It can be seen that the construction is like that described for the nonrotatable disc member 32 shown in FIG. 3 with the differences being that the expansion slots 46' open on the inner periphery of the rigid disc 44' and the torque transmitting slots 45 open on the outer periphery of the disc 44'. The rigid disc 44' of the rotatable disc members is also provided with nine expansion slots 46' whereas in the nonrotatable disc members there are eleven expansion slots. Furthermore, there are nine friction lining pads 47' disposed between the expansion slots 46' as compared to eleven lining pads 47 on the nonrotatable disc members 32, 33 and the end plates 34 and 35.

Referring to FIG. 9, a protective bearing member or wear-resistant member such as clip 58 for insertion in the torque transmitting slots 36 of the nonrotatable disc member 32 is shown in detail. The clip 58 is U-shaped having radially extending arms 59 with a connecting plate member 60 and may be of a wear-resistant or protective material such as steel, nickel-plated for facilitating axial sliding of the disc members on spline members 31. Each of the arms 59 has a resilient outwardly projecting member such as leaf spring 61 which snaps under one of the peripheral edges of the slots 36. These slots 36 and the slots 45 in the rotatable disc members have a reduced circumferential width at the peripheral edges. At the ends of the arms 59, flanges 62 are provided to form corner guards overlapping the edges of the rigid disc member 44. These flanges 62 support and protect the rigid disc member 44 minimizing the possibility of chipping or excessive wear at the edges. Each of the flanges 62 preferably extends continuously from one face of the rigid disc 44 around the peripheral edge and to the other face; however, the side flange sections may be separated from the top flang section for certain applications. Furthermore, a construction in which the flanges 62 do not cover the corners but still provide protection of the edges of the disc 44 may be provided.

Installation of clips 58 is accomplished by inserting the clips into the slots 36 so that leaf springs 61 snap out under the lips at the periperal edge of the disc 44. The clips 58 are held firmly but not rigidly in the slots 36 and thereby adjust to the changes in the size and shape of the disc 44 caused by the large temperature changes which the brake undergoes in service. Also the mounting of the clips 58 does not require any alteration of the disc 44 to hold the clips to the disc and this avoids creating areas of stress concentration which is especially critical with a frangible material such as beryllium. It is also important because torque loading is applied to this portion of the disc 44. This loading is distributed substantially evenly over the entire contact area between the clips 58 and discs 44 to further avoid high stresses from torque or impact being applied directly to the disc which could cause deterioration or failure of the disc.

The clips 58 may be removed from the slots 36 of disc 44 by first moving the arms 59 together until the leaf springs 61 are clear of the lips at the peripheral edge of the disc 44 and then pulling the clips radially out of the slots. This installation and removal does not damage the disc 44 and permits replacement of worn clips 58 without requiring replacement of the disc.

Clips 58' for insertion in the torque transmitting slots 45 of the rotatable disc members, have the same design as the clips 58 shown in FIG. 9; however, the size of the clips 58' is larger to conform with the larger size slots 45 in the rotatable disc members and provide for sliding on key members 41.

The parts of the heat sink portion of the brake described heretofore are preferably made of aircraft grade beryllium and steel which have the following properties:

| Material | Specific heat, cal./gm., °C. | Density, gm./cm.³ | Thermal conductivity, cal./cm. sec., °C. |
|---|---|---|---|
| Steel | .10 | 7.8 | .11 |
| Beryllium | .55 | 1.85 | .38 |

Steel and beryllium were chosen for this preferred embodiment; however, the design shown is adaptable for the substitution of parts of similar materials for the parts of steel and beryllium.

The brake actuating mechanism consists of hydraulic piston and cylinder assemblies 63 disposed at spaced-apart positions around the brake. Each of these hydraulic piston and cylinder assemblies 63 is mounted in a cylindrical housing 64 of the torque frame 26. A cylinder 65 is seated in sealing engagement within the housing 64. A groove 69 is provided in the housing 64 through which hydraulic fluid may be transmitted from a port 70 in the housing.

Insertable from the outboard end of the cylinder 65 is a piston 71 having a flanged cylinder-engaging portion 72 which may carry a sealing member such as resilient ring 73 for engagement with the bore of the cylinder 65. The inboard portion of the piston 71 is supported by a collar 74 at the inboard end of the cylinder 65 and is cylindrical in shape with an insulating member 75 projecting from the cavity of the cylinder to engage the retractor plate 37.

At the outboard end of the cylindrical housing 64 a cup-shaped cap member 76 is provided for enclosing the cylinder 65 but at a spaced-apart position to permit hydraulic fluid to pass between the housing and outer face of the cylinder. The cap member 76 may be removably attached to the housing as by engagement of screw thread 77 on the radially inner face of the housing and on the radially outer surface of the cap member 76. A resilient sealing member such as ring 78 may be carried by the cap member 76 for sealing engagement with the inner surface of the housing 64.

Figure 1:
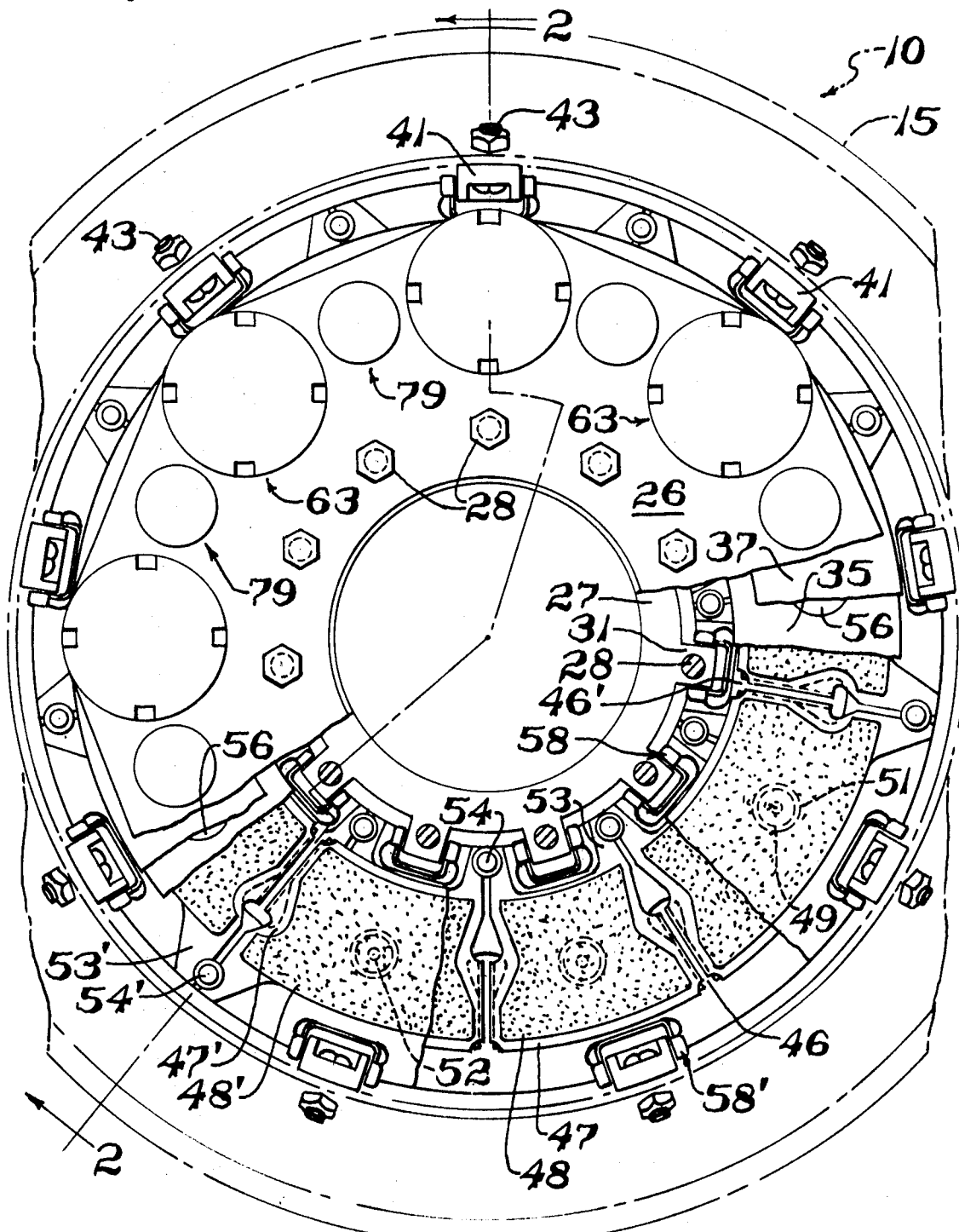
FIG. 1 is an axial elevational view of the brake mechanism looking at the axle mounting side (shown in solid lines), certain parts being broken away, and illustrating the brake mechanism mounted for operation on a typical aircraft wheel installation, the wheel being represented by chain-dotted lines with certain parts being broken away.

The retractor mechanism consists of retractor spring assemblies 79 disposed at spaced-apart positions around the brake. Each of these retractor spring assemblies 79 is mounted rigidly in the torque frame 26 and includes a cup-shaped body 80 anchored securely as by flange 81 against inboard movement. A rod 82 extends axially through the body 80 and is supported for reciprocation by an annular flange 83. The end of the rod 82 directed toward the brake discs projects through the flange 83 and is fastened tightly to retractor plate 37 as by a screw 84. The opposite end portion of rod 82 preferably includes an automatic adjusting or wear-compensating mechanism for maintaining a uniform release clearance between the friction braking members. The adjusting mechanism may be essentially like that shown in U.S. Pat. No. 3,091,310 issued to the assignee of this patent application. A helical coiled retractor spring 85 engages this mechanism and the annular flange 83 of the cup-shaped body 80 to return the retractor plate 37 to the outboard position when the brake is released. As shown in FIG. 1, these retractor spring assemblies 79 are mounted on the torque flange 24 at spaced-apart positions between the hydraulic piston and cylinder assemblies 63.

The brake operates in the manner of a conventional disc brake. Hydraulic fluid from a source of fluid pressure, not shown but which can be communicated in any appropriate way to the port 70, is introduced under pressure into each hydraulic piston and cylinder assembly 63 through the port 70 and acts against the radial end face of piston 71 displacing this piston rightwardly in FIG. 2 toward retractor plate 37 and against the opposition of spring 85 in each of the retractor spring assemblies 79. The further movement of the piston 71 in each hydraulic piston and cylinder assembly 63 slides the outboard nonrotatable end plate 35 along the spline members 31 and into engagement with the rotatable disc member 38. In the same manner, the rotatable disc member 38 slides along the key members 41 into engagement with nonrotatable disc member 32 until eventually all of the disc members are in engagement under pressure, one against the other, and against the reaction plate 29. On release of the hydraulic fluid pressure the spring 85 in each of the retractor spring assemblies 79 pulls the piston 71 in each of the piston and cylinder assemblies 63 backward and the disc members "rattle" free of the engagement with each other.

During the period of engagement, heat generated at the faces of the friction lining material is absorbed into the annular rigid discs 44, 44' primarily and into the friction lining material and lining pads 47 and 47' in minor but significant portions. The annular rigid discs 44 and 44' of the disc members are preferably of a material having a high heat capacity such as beryllium and with the construction described heretofore, these parts may be used over and over again since the wear and high stress concentrations are carried by the clips 58 and 58' which can be replaced without requiring replacement of the rigid discs 44, 44'.

We claim:
1. Friction member for a brake or clutch comprising an annular rigid disc, friction lining material attached to the face of said rigid disc, said rigid disc having slotted openings at the periphery with wear-resistant bearing members disposed in said openings for transmitting or resisting the transmission of rotational torque, said slotted openings are in spaced-apart position circumferentially around said rigid disc and having reduced circumferential width at the peripheral edge and in which the wear-resistant bearing members comprise clips of a material having greater wear resistance than the material of said rigid disc, said clips having resilient projections to underlie the peripheral edge of said slotted openings and overlapping flanges to protect the edges of said rigid discs at said slotted openings.

2. A friction member for a brake or clutch comprising an annular rigid disc, friction lining material attached to the face of said rigid disc, said rigid disc having slotted openings at the periphery with wear resistant bearing members disposed in said openings for transmitting or resisting the transmission of rotational torque, said slotted openings have a reduced circumferential width at the peripheral edge and in which the wear resistant bearing members comprise U-shaped clips with radially extending arms attached to a connecting member, resilient projections extending outward from said arms to underlie the peripheral edge of said slotted openings and overlapping flanges on said arms to protect the edges of said rigid disc at said slotted openings.

References Cited
UNITED STATES PATENTS 2,542,545   2/1951   Lyman _____ 188—73.2

GEORGE E. A. HALVOSA, Primary Examiner

U.S. Cl. X.R.

188—73.2, 218XL; 192—70.2; 287—53SS